UNITED STATES PATENT OFFICE.

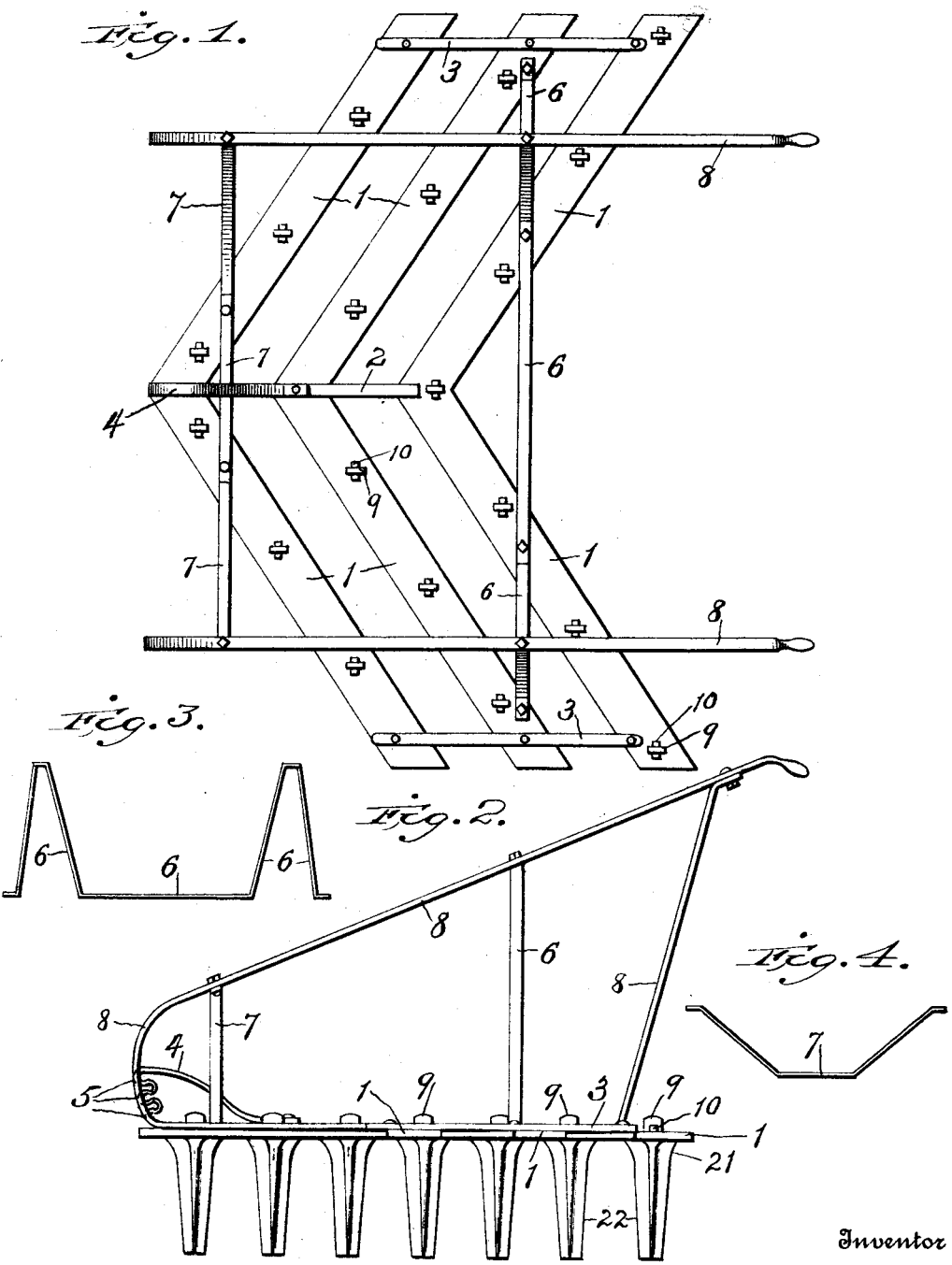

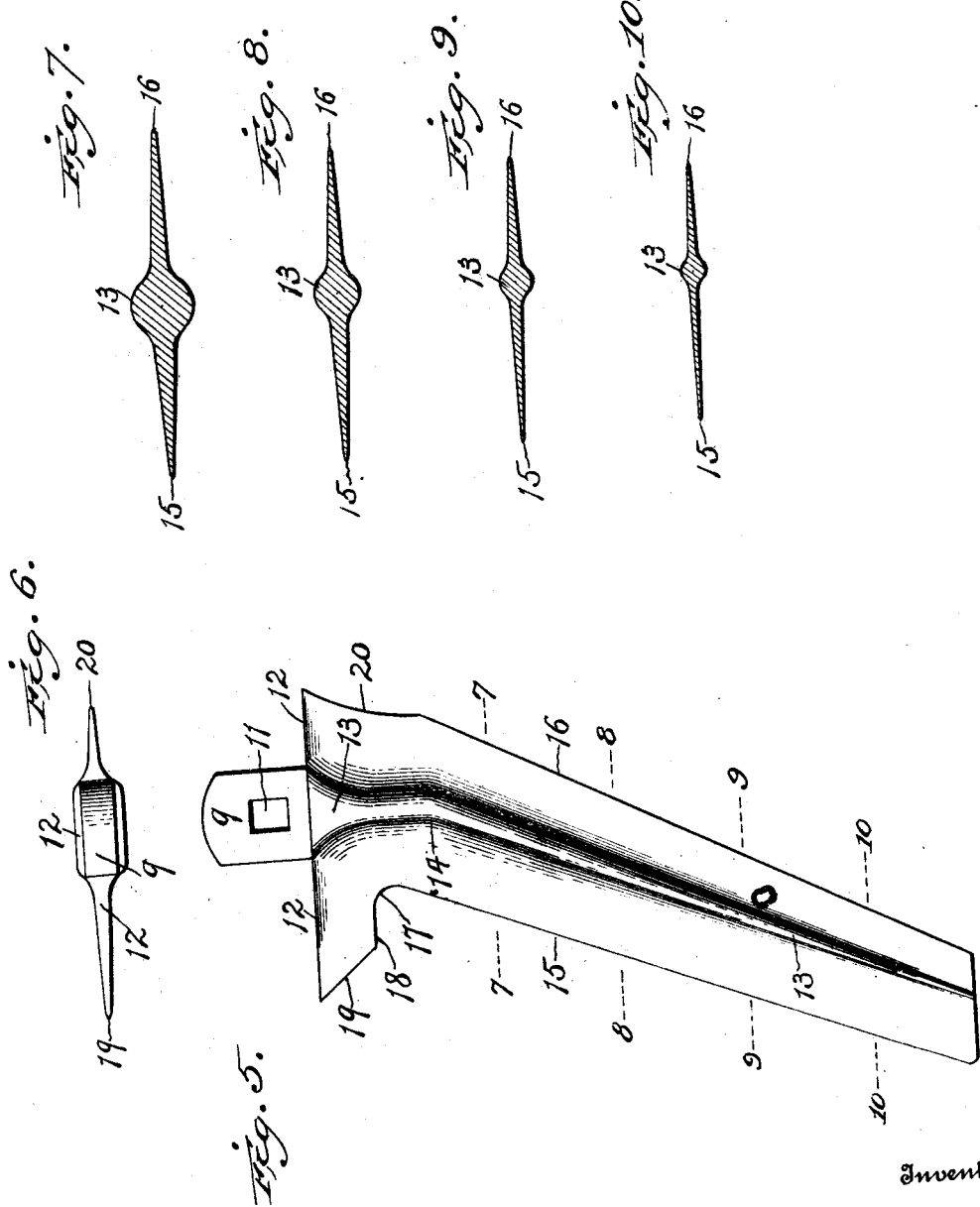

JOHN C. FREEMAN, OF RICHMOND, VIRGINIA.

HARROW.

1,033,574.  Specification of Letters Patent.  Patented July 23, 1912.

Application filed May 13, 1912. Serial No. 697,001.

*To all whom it may concern:*

Be it known that I, JOHN C. FREEMAN, a citizen of the United States, residing at Richmond, Henrico county, Virginia, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in harrows, and more especially to the form of the blades or knives, and it has for its object to so form the blades that they will reduce rough fallowed soil, that may contain roots of grass, weeds, stalks and sticks, to such a condition as will make it suitable for seeding.

The invention consists in constructing a hollow-ground blade or knife having a plurality of sharp cutting edges primarily designed to cut the fallowed soil into small pieces; in positioning two of the cutting edges so that buried obstacles as well as obstacles on the surface of the ground that are not easily severed, are, by means of said edges and the motion of the harrow brought under a horizontal cutting edge where, with the weight of the implement pressing the sharp edge upon them and the constant agitation of the soil, said objects are ultimately severed.

The invention further consists in making the blades reversible, and in positioning the cutting edges so that the reversed blade in coming in contact with a non-severable object will automatically rise and pass over the object without materially increasing the draft.

In the accompanying drawings—Figure 1 is a top plan view of a harrow embodying my invention. Fig. 2 is a side elevation thereof. Fig. 3 is an elevation on a reduced scale of the rear cross brace. Fig. 4 is a like view of the front cross brace. Fig. 5 is an enlarged side view of one form of blade. Fig. 6 is a top view of the latter. Figs. 7, 8, 9 and 10 are cross sections on the lines 7—7, 8—8, 9—9 and 10—10, respectively, of Fig. 5.

The harrow illustrated in Figs. 1 to 4 consists of a plurality of V-shaped frames composed of beams 1, which frames are spaced apart and connected by a central brace rod 2 and end rods 3. The central brace rod 2 is formed into a loop 4, the front end of which is convoluted, forming a plurality of superposed eyes 5, or clevis, to which the draft member, such as a single or double-tree (not shown) may be attached.

Transverse brace rods 6 and 7, of the form shown in Figs. 3 and 4, respectively, are bolted to the beams 1 near the rear and front of the frame, and in addition to stiffening the latter these rods form braces for side frames 8 which are bolted to said rods. These frames are so shaped that they not only constitute handles elevated at the rear for the convenient manipulation of the harrow, but they also constitute runners upon which the frame may be supported, when being transported from place to place over unplowed ground, by simply inverting the frames.

While the above described construction and arrangement of parts form an important feature of my invention, going to make up a rigid, durable and easily constructed frame, the essential feature of my invention lies in the special construction of the harrow-blades.

As shown in detail in Figs. 5 to 10, the blades are made in the form of hollow-ground blades, each of which is formed with a vertical shank 9, rectangular in cross-section and adapted to project through a rectangular opening in the beam 1 to which said shank is detachably secured by means of a cotter-pin 10 which passes through a hole 11 in the shank. This connection permits a ready attachment and detachment of the blade to and from the beam for the purpose of reversing the position of the blade, which latter is designed for this purpose.

The base of the shank is formed with a surrounding horizontal shoulder 12 which abuts against the bottom of the beam 1 when the shank is placed in the latter. Below said shoulder the blade is formed with a central rib, 13, which extends downward in a vertical direction a short distance from the shoulder and then deviates at 14 from the vertical direction at an obtuse angle and gradually diminishes in cross-section, as clearly shown in Figs. 7 to 10.

The blade diminishes in thickness from the rib to the front and rear forming two straight cutting edges 15, 16. The front straight edge, 15, when in operative position, inclines rearwardly from the lower end to a point above the angle of the rib 13 where it merges into a curved cutting edge 17, and horizontal cutting edge 18 from which said blade extends to the shoulder 12 in a forwardly inclined direction, presenting a short cutting edge, 19.

By reversing the position of the blade to bring the cutting edge 16 into operative position said edge will be inclined forwardly from its lower end and extends in a straight line from said lower end to a point in line with the angle of the rib from whence it extends, to the shoulder 12, in a concave cutting edge 20.

The blades shown in Fig. 2 have a central rib and are hollow-ground like those above-described, but the cutting edges symmetrically converge from the shoulder in concave curves 21 to a point a short distance below said shoulder and extend from said curves in straight converging cutting edges 22 to the lower ends of the blades.

The above-described blades are designed to not only cut up the soil, but to cut such obstacles as large roots, corn stalks, bean poles and the like, which have been buried in plowing. When such obstacles are encountered by harrows having the ordinary form of teeth they offer so great a resistance that the harrow has to be lifted over them, thus leaving said obstacles to be brought to the surface later, when the crop is being plowed, and so destroy many young plants.

Blades of the form shown in Fig. 2 will operate under ordinary conditions to cut up the soil more easily than teeth of the ordinary form, but where obstacles are unusually numerous and large, the form of blade shown in Fig. 5 will operate more satisfactorily. If a stalk or root is encountered by the blade at a point below the horizontal edge 18, the forward movement of the blade will cause such stalk or root to move up along the edge 15 until it reaches the edge 18, and the irregular pressure of the harrow frame will cause the obstacle to be chopped in two. If a stalk on the surface is encountered, it will at once be engaged by the inclined edge 19, and likewise fed to the horizontal edge 18 and severed, without materially impeding the progress of the harrow. Where a light harrowing only is required, for example, when the land is to be rolled and seeded broadcast, the blades may be reversed, running edges 16 and 20 in front, which will reduce the draft on the team. By the expression "hollow ground" used in the specification and claims, in defining the form of the blade, it is to be understood to mean a blade having the form similar to a hollow ground razor. In the manufacture of my blades they may be cast in the form defined.

I claim—

1. A harrow comprising hollow-ground blades, each blade having a horizontal cutting edge and two inclined cutting edges arranged to feed an object to said horizontal edge.

2. A harrow comprising hollow-ground blades, each blade having a horizontal cutting edge merging into an upward and forward inclined edge extending to the harrow frame at one end, and into a downward and forward inclined cutting edge at the other end.

3. A harrow tooth comprising hollow-ground tapering blades, one side of each blade having a horizontal cutting edge merging into an upward and forward inclined edge extending to the underside of the harrow frame, the other end of said horizontal edge connected by a concave curve to a downward and forward inclined edge.

4. A harrow comprising reversible hollow-ground tapering blades, one side of each blade having a horizontal cutting edge merging into an upward and forward inclined edge extending to the underside of the harrow frame, the other end of said horizontal edge connected by a concave curve to a downward and forward inclined edge, the other side of said blade having a concave curved edge extending below the harrow frame and a straight inclined portion.

In testimony that I claim the foregoing as my invention, I have signed my name in presence of two subscribing witnesses.

JNO. C. FREEMAN.

Witnesses:
  O. W. KUEHEMAN,
  G. EDW. BOWERS.